United States Patent
Ehret et al.

(10) Patent No.: US 8,726,174 B2
(45) Date of Patent: May 13, 2014

(54) METHOD AND SYSTEM FOR SHOWING A DISPLAY PANEL IN A GRAPHICAL USER INTERFACE

(75) Inventors: Brian Douglas Ehret, Boulder, CO (US); Elizabeth Sanford Clayton, San Francisco, CA (US); Karen Ann Stanley, Leominster, MA (US); Devjani Ray, Lexington, MA (US); Daniel Arthur Labrecque, Tyngsboro, MA (US)

(73) Assignee: Oracle America, Inc., Redwood City, CA (US)

( * ) Notice: Subject to any disclaimer, the term of this patent is extended or adjusted under 35 U.S.C. 154(b) by 1579 days.

(21) Appl. No.: 11/583,387

(22) Filed: Oct. 19, 2006

(65) Prior Publication Data

US 2007/0300166 A1    Dec. 27, 2007

Related U.S. Application Data

(60) Provisional application No. 60/816,420, filed on Jun. 26, 2006.

(51) Int. Cl.
*G06F 3/00* (2006.01)

(52) U.S. Cl.
USPC ........... 715/760; 715/733; 715/742; 715/746; 715/765; 715/768; 715/778; 715/793; 715/803; 715/825

(58) Field of Classification Search
USPC ......... 715/760, 768, 733, 742, 746, 765, 778, 715/793, 803, 825
See application file for complete search history.

(56) References Cited

U.S. PATENT DOCUMENTS

| | | | | |
|---|---|---|---|---|
| 5,414,809 | A * | 5/1995 | Hogan et al. | 715/765 |
| 5,447,164 | A * | 9/1995 | Shaya et al. | 600/523 |
| 5,825,356 | A * | 10/1998 | Habib et al. | 715/712 |
| 7,287,031 | B1 * | 10/2007 | Karpf et al. | 1/1 |
| 7,311,666 | B2 * | 12/2007 | Stupp et al. | 600/300 |
| 7,333,939 | B1 * | 2/2008 | Stender et al. | 705/4 |
| 8,224,667 | B1 * | 7/2012 | Miller et al. | 705/2 |
| 8,234,251 | B2 * | 7/2012 | Mindrum | 707/661 |
| 2002/0054161 | A1 * | 5/2002 | Durham | 345/841 |
| 2002/0088008 | A1 * | 7/2002 | Markel | 725/135 |
| 2002/0178187 | A1 * | 11/2002 | Rasmussen et al. | 707/513 |
| 2002/0184401 | A1 * | 12/2002 | Kadel et al. | 709/315 |
| 2003/0130979 | A1 * | 7/2003 | Matz et al. | 707/1 |
| 2003/0167315 | A1 * | 9/2003 | Chowdhry et al. | 709/218 |
| 2004/0119713 | A1 * | 6/2004 | Meyringer | 345/440 |
| 2004/0205185 | A1 * | 10/2004 | Leonik | 709/224 |

(Continued)

OTHER PUBLICATIONS

Idaho commision for libraries glossary, Jul. 17, 2010.*

(Continued)

*Primary Examiner* — Boris Pesin
*Assistant Examiner* — John Heffington
(74) *Attorney, Agent, or Firm* — Osha Liang LLP (57) ABSTRACT

A method for showing a display panel in a graphical user interface involves associating a client-side script variable with a display panel wrapper, where the display panel is embedded in the display panel wrapper, and where the client-side script variable indicates that the display panel is hidden. The method further involves modifying the client-side script variable to show the display panel in the graphical user interface, where showing the display panel involves showing an input control for manipulating a data area in the graphical user interface.

17 Claims, 4 Drawing Sheets

(56) References Cited

U.S. PATENT DOCUMENTS

| | | | |
|---|---|---|---|
| 2004/0210536 A1* | 10/2004 | Gudelj et al. | 705/64 |
| 2004/0221242 A1* | 11/2004 | Chen et al. | 715/810 |
| 2004/0243575 A1* | 12/2004 | Ohashi | 707/3 |
| 2005/0010594 A1* | 1/2005 | Chen et al. | 707/104.1 |
| 2005/0165626 A1* | 7/2005 | Karpf | 705/3 |
| 2006/0031882 A1* | 2/2006 | Swix et al. | 725/46 |
| 2007/0136378 A1* | 6/2007 | Karpf et al. | 707/104.1 |
| 2007/0226635 A1* | 9/2007 | Goebel et al. | 715/745 |
| 2010/0122275 A1* | 5/2010 | Swix et al. | 725/5 |

OTHER PUBLICATIONS

Artwork Definitions, 2010, Apollo Design Technology Inc.*
jans working with databases glossary-eembed, Jul. 17, 2010.*
table, webopedia, 2010.*
bing search q=display+panel+wrapper&qs=n&form=QB Dec. 25, 2013.*
bing search q=display+panel+wrapper+hidden&qs=n& Dec. 25, 2013.*
bing search q=display+panel+wrapper+hidden+sort& Dec. 25, 2013.*

* cited by examiner

METHOD AND SYSTEM FOR SHOWING A DISPLAY PANEL IN A GRAPHICAL USER INTERFACE

CROSS-REFERENCE TO RELATED APPLICATIONS

This application claims benefit of U.S. Provisional Patent Application No. 60/816,420, filed on Jun. 26, 2006 and titled "Method and System for Showing a Display Panel in a Graphical User Interface," in the names of the same inventors as the present application.

BACKGROUND

Modern computing applications typically include some form of graphical user interface (GUI), i.e., a graphical interface providing access to functionality of the application. Web pages are one example of a graphical user interface. GUIs may also be used in stand-alone software applications, embedded devices, consumer electronics, etc.

To implement a GUI, certain design concerns may need to be taken into consideration. For example, in web-based applications, reducing the number of round-trips to a server may be a concern. As a further example, in applications presented on small form-factor displays, optimal use of available display real estate may be a concern. Different design concerns may arise, depending, for example, on the computing platform to which the application is directed, aesthetic preferences, available network bandwidth, etc.

SUMMARY

In general, in one aspect, the invention relates to a method for showing a display panel in a graphical user interface. The method comprises associating a client-side script variable with a display panel wrapper, wherein the display panel is embedded in the display panel wrapper, and wherein the client-side script variable indicates that the display panel is hidden, and modifying the client-side script variable to show the display panel in the graphical user interface, wherein showing the display panel comprises showing an input control for manipulating a data area in the graphical user interface.

In general, in one aspect, the invention relates to a system. The system comprises a data area associated with a graphical user interface, a display panel wrapper associated with the graphical user interface, a display panel embedded in the display panel wrapper, wherein the display panel comprises an input control for manipulating the data area, and a client-side script variable associated with the display panel wrapper, wherein the client-side script variable controls whether the display panel is hidden within the graphical user interface, and wherein the client-side script variable is modified to show the display panel in the graphical user interface.

In general, in one aspect, the invention relates to a computer readable medium. The computer readable medium comprises executable instructions for showing a display panel in a graphical user interface by associating a client-side script variable with a display panel wrapper, wherein the display panel is embedded in the display panel wrapper, and wherein the client-side script variable indicates that the display panel is hidden, and modifying the client-side script variable to show the display panel in the graphical user interface, wherein showing the display panel comprises showing an input control for manipulating a data area in the graphical user interface.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for showing a display panel in a graphical user interface. The display panel is embedded in a display panel wrapper, which is associated with a client-side script variable. The client-side script variable indicates that the display panel is hidden, and modifying the client-side script variable results in the display panel being shown in the graphical user interface.

Figure 1:
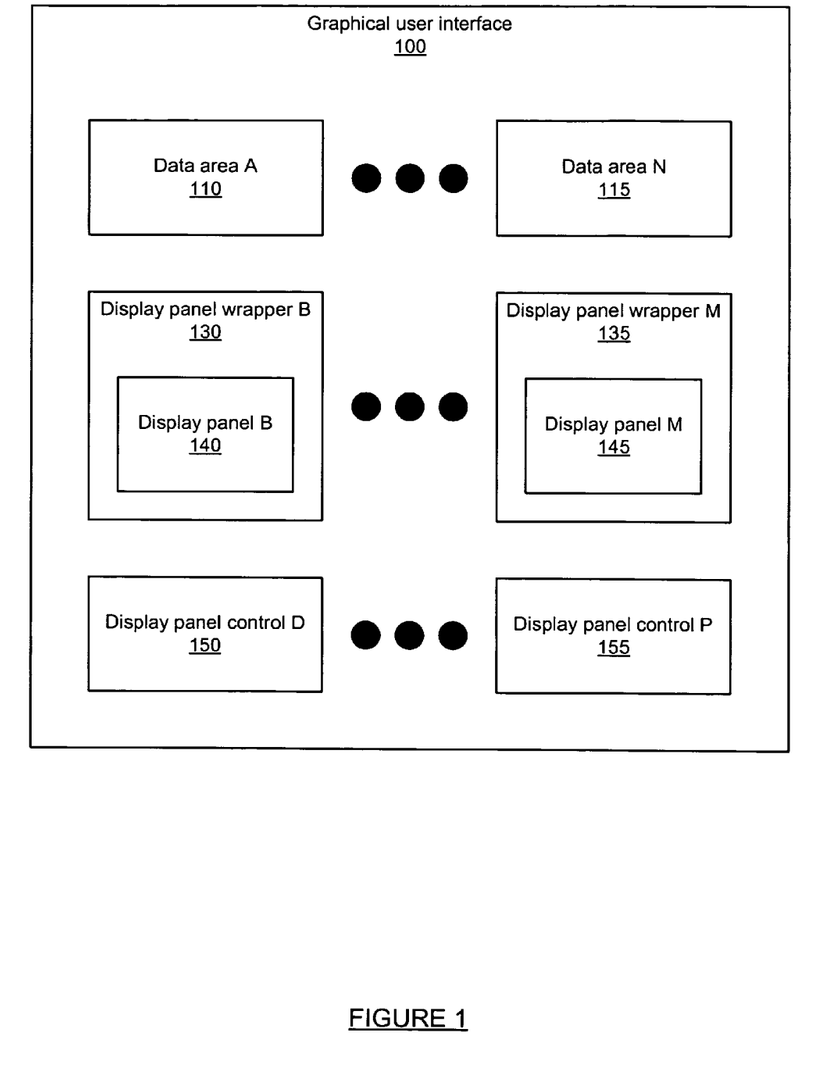
FIG. 1 shows a diagram of a graphical user interface in accordance with one or more embodiments of the invention.

FIG. 1 shows a diagram of a graphical user interface (100) in accordance with one or more embodiments of the invention. Those skilled in the art will appreciate that the visual arrangement of components shown in FIG. 1 is exemplary only, and should not be construed as limiting the scope of the invention in any way. In one or more embodiments of the invention, the graphical user interface (100) may be a web page, a graphical user interface for a stand-alone software application, a graphical user interface for an embedded device, a graphical user interface for a consumer electronic device, or any other similar type of graphical user interface. The graphical user interface (100) may be displayed on a cathode ray tube (CRT) display, a rear projection display, a liquid crystal display (LCD), or any other similar type of display.

In one or more embodiments of the invention, the graphical user interface (100) may include one or more data areas (e.g., data area A (110), data area N (115)). A data area (e.g., 110, 115) is, generally, an area of the graphical user interface (100) used to display data. For example, a data area (e.g., 110, 115) may include text, images, icons, any other similar type of data, or any combination thereof. Specifically, a data area (e.g., 110, 115) may include multiple columns of data that may be manipulated (i.e., updated, modified, deleted, etc.) using one or more input controls (not shown). Further, if more than one data area (e.g., 110, 115) is used, the data areas (e.g., 110, 115) may be visually arranged in any order. In other words, one or more of the data areas (e.g., 110, 115) may not be directly adjacent to each other.

In one or more embodiments of the invention, the graphical user interface (100) may include one or more display panels (e.g., display panel B (140), display panel M (145)). A display panel (e.g., 140, 145) is, generally, a specific area of the graphical user interface (100) that is embedded in a display panel wrapper (e.g., 130, 135). Display panel wrappers (e.g., 130, 135) are described in detail below.

In one or more embodiments of the invention, a display panel (e.g., 140, 145) may include text, an image, a video, an input control, any other type of graphical element, or any combination thereof. Specifically, in one or more embodiments of the invention, one or more display panels (e.g., 140, 145) may include one or more input controls associated with functionality of the graphical user interface (100). In particular, the display panel (e.g., 140, 145) may include one or more input controls for manipulating a data area (e.g., 110, 115). More specifically, manipulating a data area (e.g., 110, 115) may involve filtering data (i.e., indicating which data is shown), sorting the data, modifying a preference (e.g., an aesthetic preference) associated with the data area (e.g., 110, 115), any other similar type of action, or any combination thereof.

For example, if the graphical user interface (100) is a web page, one or more of the display panels (e.g., 140, 145) may include a button, a radio button, a checkbox, a dropdown menu, a text box, a hyperlink, any other similar type of control configured to obtain user input (e.g., a mouse click, text entry, an audio command, etc.), or any combination thereof. More specifically, one or more of the display panels (e.g., 140, 145) may be a dialog box, i.e., textual information combined with one or more input controls for responding to the textual information.

In one or more embodiments of the invention, each display panel (e.g., 140, 145) may be embedded in a display panel wrapper (e.g., 130, 135). A display panel wrapper (e.g., 130, 135) is, generally, a programmatic element in which the display panel (e.g., 140, 145) is embedded, and which provides functionality to hide and/or show the display panel (e.g., 140, 145). In one or more embodiments of the invention, the display panel wrapper is found within a cell of a table, a defined space of an object, within a portion of a web page, etc. within the graphical user interface (100). Specifically, in one or more embodiments of the invention, display panel wrappers (e.g., 130, 135) are associated with client-side script variables (not shown) indicating whether the display panels (e.g., 140, 145) are hidden or shown in the graphical user interface (100).

For example, if the graphical user interface (100) is a web page, one or more of the display panel wrappers (e.g., 130, 135) may be a hypertext markup language (HTML) tag (e.g., <div>, <table>, <p>, <td>, <tr>, etc.). Continuing with the example, the HTML tag may be associated with a JavaScript variable, Visual Basic Script (VBScript) variable, a cascading style sheet (CSS) property, or any other similar type of client-side script variable.

Example 1 shows one example of how a CSS property may be associated with an HTML <div> tag so that text embedded in the <div> tag is initially hidden.

EXAMPLE 1

Hiding Text in a <div> Tag Using a CSS property

```
<div style="display:none" id="ex1">Hello, world</div>
```

In Example 1, when the web page is first displayed, because the CSS "display" property of the <div> tag is "none," the text "Hello, world" embedded in the <div> tag is hidden.

Returning to discussion of FIG. 1, in one or more embodiments of the invention, the graphical user interface (100) may include one or more display panel controls (e.g., 150, 155). Specifically, each display panel control (e.g., 150, 155) may be a control (e.g., a button, a dropdown menu, an icon, etc.) providing functionality associated with a display panel (e.g., 140, 145). For example, one or more of the display panel controls (e.g., 150, 155) may be configured to show and/or hide a display panel (e.g., 140, 145) by modifying a client-side script variable associated with the display panel wrapper (e.g., 130, 135) in which the display panel (e.g., 140, 145) is embedded. In one or more embodiments of the invention, one or more of the display panels (e.g., 140, 145) may also include display panel controls (e.g., 150, 155).

Building on Example 1, discussed above, Example 2 shows one example of how text embedded in an HTML <div> tag may be shown by modifying a CSS property.

EXAMPLE 2

Showing Hidden Text in Response to an onClick Event

```
<script language="JavaScript">
function togglePanel(id) {
    document.getElementById(id).style.display = "block";
}
</script>
<div style="display:none" id="ex1">Hello, world</div>
<input type=button onClick=togglePanel("ex1")>
```

In Example 2, if a user selects the button, a mouse click event is generated, in response to which the "togglePanel" JavaScript function is executed. The function modifies the CSS "display" property of the <div> tag to "block." When the "display" property is modified, the text "Hello, world" is shown in the web page. In one or more embodiments of the invention, functionality may be included to hide the text once more by toggling the "display" property back to "none" if the button is selected again. Alternatively, functionality may be included for the selection of another button (not shown in Example 2) to toggle the "display" property back to "none."

In one or more embodiments of the invention, a data area (e.g., 110, 115) and a display panel wrapper (e.g., 130, 135) may both be parts of a single data structure (i.e., an HTML tag, an object, a function, or any other similar type of data structure) within the graphical user interface (100). For example, if the data area (e.g., 110, 115) is an HTML table, the display panel wrapper (e.g., 130, 135) may be embedded in a row or column of the HTML table. Specifically, the display panel wrapper (e.g., 130, 135) may consist of an HTML <div> tag embedded in a <tr> or <td> tag of the HTML table.

In particular, the data area (e.g., 110, 115) and the display panel wrapper (e.g., 130, 135) may be combined in a single data structure if a display panel (e.g., 140, 145) embedded in the display panel wrapper (e.g., 130, 135) includes an input control for updating and/or modifying the data area (e.g., 110, 115). Said another way, a data area (e.g., 110, 115) and a display panel wrapper (e.g., 130, 135) may be combined in a single data structure based on having a shared functional context within the graphical user interface (100).

Figure 2:
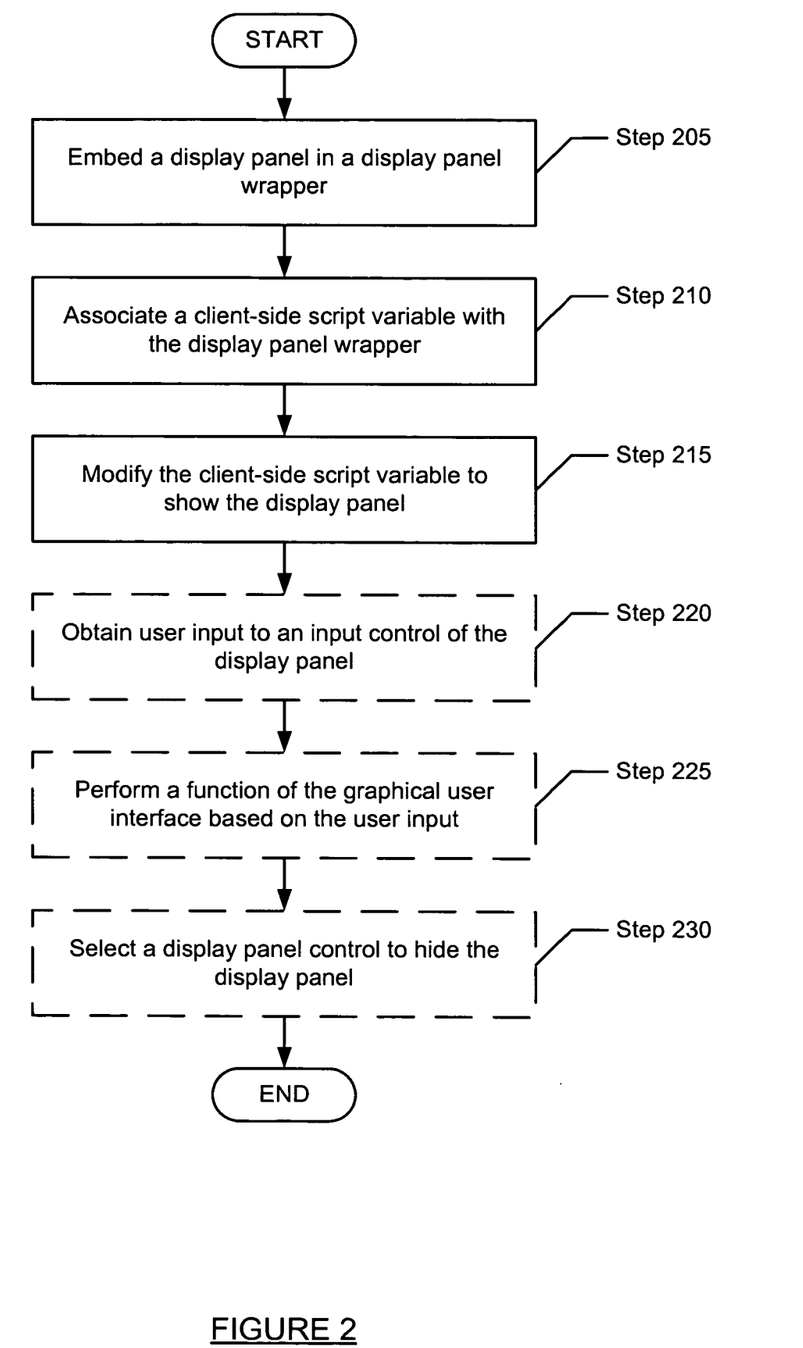
FIG. 2 shows a flowchart in accordance with one or more embodiments of the invention.

As discussed above, Example 2 shows a specific example of how a display panel (e.g., text embedded in an HTML <div> tag) may be shown in a graphical user interface (e.g., a web page). More generally, FIG. 2 shows a flowchart in accordance with one or more embodiments of the invention. Specifically, FIG. 2 shows a flowchart of a method for showing a display panel in a graphical user interface, in accordance with one or more embodiments of the invention.

Initially, a display panel is embedded in a display panel wrapper (Step 205). For example, as described above, the display panel may be embedded in an HTML tag. Alternatively, the display panel may include one or more output statements embedded in a class object, such as a Java™ class object. As another example, the display panel may include one or more output statements embedded in a client-side script function, such as a JavaScript function or VBScript function. As a further example, the display panel may include display code, such as HTML or compiled code, embedded in a file stored on the user's local hard drive or other local storage.

The display panel wrapper is associated with a client-side script variable (Step 210). For example, as described above, an HTML tag may include a CSS property, such as a "display" property. Alternatively, a JavaScript variable, VBScript variable, or any other similar type of client-side script variable may be used. Those skilled in the art will appreciate that in one or more embodiments of the invention, Step 210 may be performed prior to Step 205, or concurrently with Step 205. The client-side script variable is subsequently modified to show the display panel (Step 215). For example, the client-side script variable may be modified by selecting a display panel control. Alternatively, the client-side script variable may be modified in response to any other type of programmatic event. For example, the client-side script variable may be modified in response to invalid text being entered in a text box, a time limit expiring, moving a mouse cursor over a specific area of the graphical user interface, or any other similar type of event.

In the following discussion, in one or more embodiments of the invention, one or more of Steps 220-230 are optionally performed. In Step 220, user input is obtained in an input control of the display panel. For example, if the display panel includes a text box, a user may enter text into the text box. As a further example, if a data area of the graphical user interface includes a list of employees, a button for sorting the employees by last name may be selected by the user.

In Step 225, a function of the graphical user interface is performed, based on the user input. For example, if the user enters text into a text box, the text may be used to populate a data area of the graphical user interface. As another example, if the user selects a button for sorting employees by last name, the employees may subsequently be sorted. More generally, the function of the graphical user interface may involve manipulating data by filtering the data (i.e., indicating which data is shown), sorting the data, modifying a preference (e.g., an aesthetic preference) associated with the data area, any other similar type of action, or any combination thereof.

In Step 230, a display panel control is selected to hide the display panel once again. In one or more embodiments of the invention, if a display panel control is used to show the display panel, then the same display panel control may be used to hide the display panel. Alternatively, a different display panel control may be used.

In one or more embodiments of the invention, showing a display panel using the method of FIG. 2 may improve application performance. For example, if the application is a web-based application (i.e., the graphical user interface is a web page), embedding a display panel in a display panel wrapper may reduce the number of network round-trips to a server. Specifically, if a client loads a web page having a display panel embedded in a display panel wrapper, the client need not query a server to obtain access to the display panel when the access is needed. Accordingly, if the application is web-based, embedding a display panel in a display panel wrapper may decrease the amount of time required to show the display panel, remove the possibility of a network timeout or server access error when showing the display panel, or provide any other similar type of benefit.

Moreover, if the application is web-based, because the display panel is contained within the web page, the method of FIG. 2 may provide a means for circumventing browser "popup blockers," i.e., mechanisms used by browsers to block web pages from creating new windows (i.e., loading additional web pages, dialog boxes, etc.).

In addition, one or more embodiments of the invention may allow a user to hide and/or show display panels when desired. In other words, the user may be able to use a display panel control to show the display panel when access to the display panel is needed, and hide the display panel when access to the display panel is no longer needed.

Figure 3A:
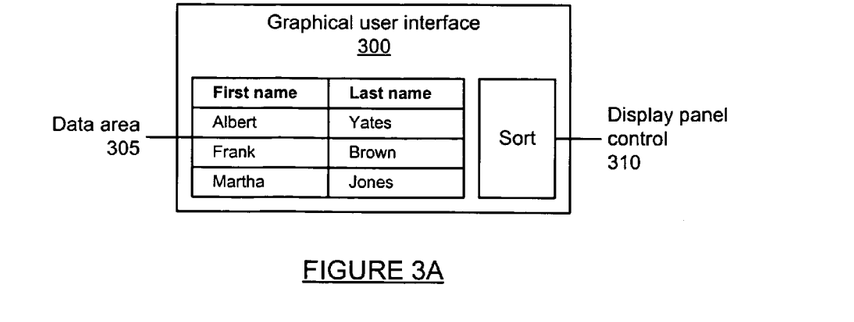
FIGS. 3A-3C show an exemplary diagram of a graphical user interface in accordance with one or more embodiments of the invention.
Figure 3B:
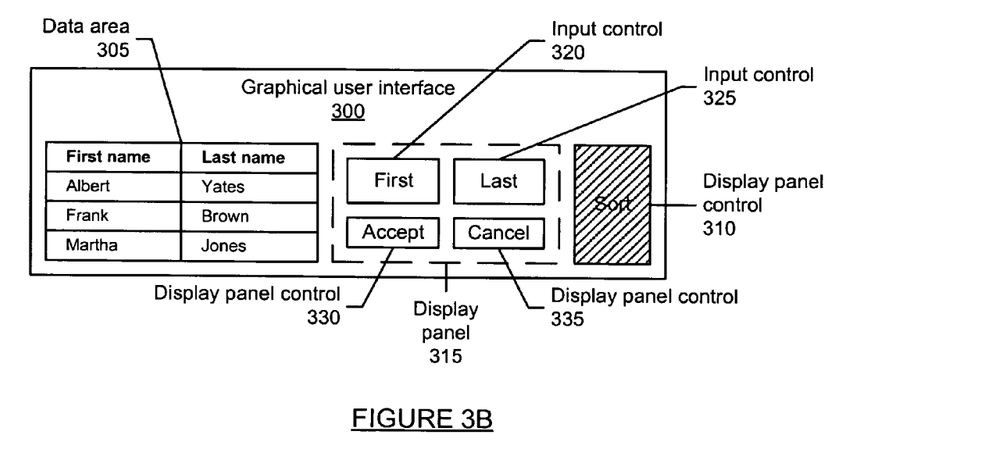
Figure 3C:
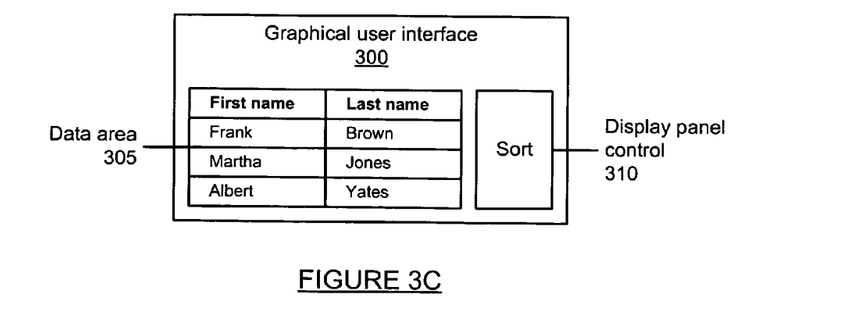

FIGS. 3A-3C show an exemplary diagram of a graphical user interface (300) in accordance with one or more embodiments of the invention. Specifically, FIGS. 3A-3C show an exemplary diagram of the method of FIG. 2 being applied to the graphical user interface (300).

More specifically, in the example, the graphical user interface includes a data area (305) and a display panel control (310). The display panel control (310) is configured to modify a client-side script variable (not shown) associated with a display panel wrapper (not shown). Specifically, as shown in FIG. 3A, the client-side script variable initially indicates that a display panel (315) embedded in the display panel wrapper is hidden.

As shown in FIG. 3B, in the example, selecting the display panel control (310) modifies the client-side script variable to show the display panel (315). More specifically, the display panel (315) shown includes two input controls (320, 325) and two display panel controls (330, 335). In the example, input control (320) is configured to sort names displayed in the data area (305) by first name, and input control (325) is configured to sort the names by last name. Further, display panel control (330) is configured to accept any changes affected by the input controls (320, 325), and display panel control (325) is configured to cancel any such changes. In addition, as shown in FIG. 3B, in one or more embodiments of the invention, selecting the display panel control (310) may modify the appearance of the display panel control (310) to indicate that the display panel control (310) has been selected.

In one or more embodiments of the invention, the client-side script variable may be modified to hide the display panel (315) by selecting one of the input controls (320, 325), one of the display panel controls (330, 335), and/or reselecting display panel control (310). FIG. 3C shows the result of selecting input control (325) to sort the names by last name and then hiding the display panel (315) once again.

Figure 4:
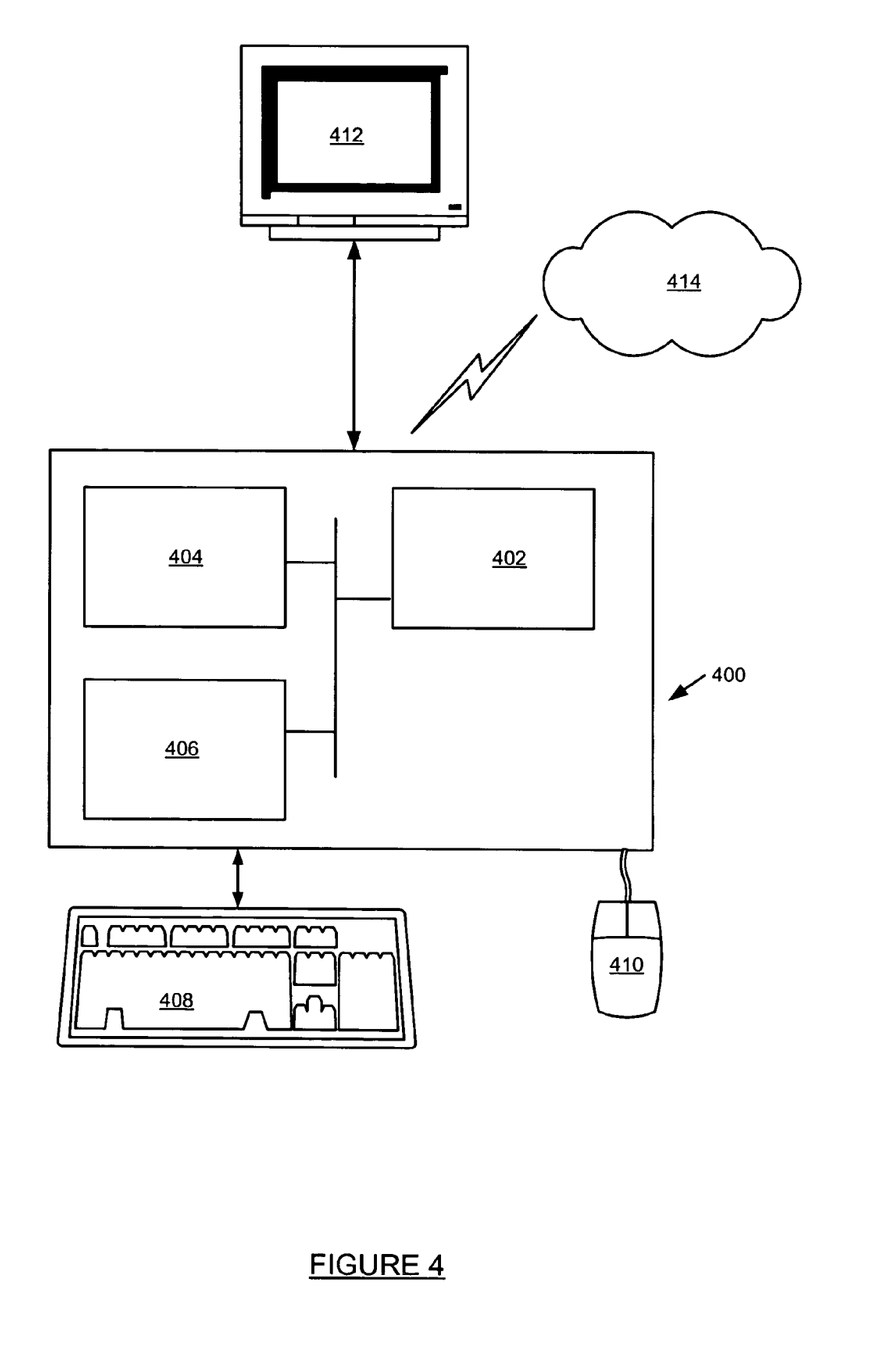
FIG. 4 shows a diagram of a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) may be connected to a network (414) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., graphical user interface, data area, display panel wrapper, display panel, display panel control, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for showing a display panel in a graphical user interface, comprising:
    displaying, on a display device and using a computer processor, the graphical user interface comprising a data area, a display panel wrapper, and a display panel control,
        wherein the display panel wrapper comprises the display panel,
        wherein the display panel wrapper is associated with a client-side script variable,
        wherein the display panel comprises an input control for manipulating the data area,
        wherein the display panel is initially hidden in the graphical user interface,
        wherein the client-side script variable initially indicates that the display panel is hidden in the graphical user interface;
    receiving, at the display panel control, a first user event indicating a requirement to display the display panel;
    modifying, using the computer processor, in response to the first user event, the client-side script variable to show the display panel in the graphical user interface;
    showing, in response to modifying the client-side script variable, the display panel in the graphical user interface,
        wherein the data area in the graphical user interface comprises a table comprising sortable data,
        wherein the data area is not hidden in the graphical user interface;
    receiving, at the input control of the display panel, a second user event comprising a sort request to sort the table in the data area; and
    displaying, on the display device and in response to the sort request, a sorted table comprising the sortable data in the table sorted.

2. The method of claim 1, further comprising:
    receiving, at the display panel control, a third user event, indicating a requirement to hide the display panel; and
    modifying, in response to the third user event, the client-side script variable to hide the display panel in the graphical user interface.

3. The method of claim 1, further comprising:
    obtaining user input to the input control; and
    further manipulating the data area based on the user input.

4. The method of claim 1, wherein manipulating the data area comprises an action selected from a group consisting of filtering the data area and modifying a preference associated with the data area.

5. The method of claim 1, wherein the graphical user interface comprises a web page.

6. The method of claim 5, wherein the display panel wrapper comprises a hypertext markup language (HTML) tag, and wherein the client-side script variable comprises a cascading style sheet (CSS) display property.

7. The method of claim 6, wherein the HTML tag comprises a <div> tag.

8. The method of claim 1, wherein modifying the client-side script variable is performed in response to a mouse click event.

9. The method of claim 1, wherein the data area comprises a plurality of columns of data displayed in the graphical user interface.

10. The method of claim 1, wherein the display panel wrapper and the data area are comprised in a same data structure in the graphical user interface.

11. The method of claim 10, wherein the same data structure is a hypertext markup language (HTML) table.

12. The method of claim 11, wherein the display panel wrapper is embedded in a row of the HTML table.

13. A system comprising:
    a display device configured to display a graphical user interface;
    a processor; and
    a computer readable medium comprising computer readable code, executable by the processor, configured to perform a method comprising:
        displaying, on the display device, the graphical user interface comprising a data area, a display panel wrapper, and a display panel control,
            wherein the display panel wrapper comprises the display panel,
            wherein the display panel wrapper is associated with a client-side script variable,
            wherein the display panel comprises an input control for manipulating the data area,
            wherein the display panel is initially hidden in the graphical user interface,
            wherein the client-side script variable initially indicates that the display panel is hidden in the graphical user interface;
        receiving, at the display panel control, a first user event indicating a requirement to display the display panel;
        modifying, in response to the first user event, the client-side script variable to show the display panel in the graphical user interface;
        showing, in response to modifying the client-side script variable, the display panel in the graphical user interface,
            wherein the data area in the graphical user interface comprises a table comprising sortable data,
            wherein the data area is not hidden in the graphical user interface;

receiving, at the input control of the display panel, a second user event comprising a sort request to sort the table in the data area; and displaying, on the display device and in response to the sort request, a sorted table comprising the sortable data in the table sorted.

14. The system of claim 13, wherein manipulating the data area further comprises an action selected from a group consisting of filtering the data area and modifying a preference associated with the data area.

15. The system of claim 13, wherein the graphical user interface comprises a web page.

16. The system of claim 15, wherein the display panel wrapper comprises a hypertext markup language (HTML) tag, and wherein the client-side script variable comprises a cascading style sheet (CSS) display property.

17. A non-transitory computer readable medium comprising executable instructions for showing a display panel in a graphical user interface by:

displaying, on a display device and using a computer processor, the graphical user interface comprising a data area, a display panel wrapper, and a display panel control, wherein the display panel wrapper comprises the display panel, wherein the display panel wrapper is associated with a client-side script variable, wherein the display panel comprises an input control for manipulating the data area, wherein the display panel is initially hidden in the graphical user interface, wherein the client-side script variable initially indicates that the display panel is hidden in the graphical user interface;

receiving, at the display panel control, a first user event indicating a requirement to display the display panel;

modifying, in response to the first user event, the client-side script variable to show the display panel in the graphical user interface;

showing, in response to modifying the client-side script variable, the display panel in the graphical user interface, wherein the data area in the graphical user interface comprises a table comprising sortable data, wherein the data area is not hidden in the graphical user interface;

receiving, at the input control of the display panel, a second user event comprising a sort request to sort the table in the data area; and displaying, on the display device and in response to the sort request, a sorted table comprising the sortable data in the table sorted.

* * * * *